(12) United States Patent
Leckey et al.

(10) Patent No.: US 9,785,766 B2
(45) Date of Patent: Oct. 10, 2017

(54) AUTOMATED PASSWORD MANAGEMENT

(75) Inventors: Alexander Leckey, Kilcock (IE); Edward Shogulin, Nizhniy Novgorod (RU)

(73) Assignee: Intel Corporation, Santa Clara, CA (US)

(*) Notice: Subject to any disclaimer, the term of this patent is extended or adjusted under 35 U.S.C. 154(b) by 473 days.

(21) Appl. No.: 13/993,110

(22) PCT Filed: Sep. 30, 2011

(86) PCT No.: PCT/US2011/054445
§ 371 (c)(1),
(2), (4) Date: Jun. 11, 2013

(87) PCT Pub. No.: WO2013/048504
PCT Pub. Date: Apr. 4, 2013

(65) Prior Publication Data
US 2013/0263250 A1 Oct. 3, 2013

(51) Int. Cl.
*G06F 12/14* (2006.01)
*H04L 29/06* (2006.01)
*G06F 21/45* (2013.01)

(52) U.S. Cl.
CPC ......... *G06F 21/45* (2013.01); *H04L 63/0846* (2013.01); *G06F 2221/2137* (2013.01)

(58) Field of Classification Search
None
See application file for complete search history.

(56) References Cited

U.S. PATENT DOCUMENTS 6,567,919 B1 * 5/2003 Yanagihara ............. G06F 21/31
709/227
8,060,919 B2 * 11/2011 Andrasak et al. ............... 726/6
(Continued)

FOREIGN PATENT DOCUMENTS

CN 1758650 4/2006
EP 0752636 1/1997
(Continued)

OTHER PUBLICATIONS

Japanese Patent Office, "Notice of Reasons for Rejection" dated Jun. 16, 2015, in Japanese application No. 2014-533280.
(Continued)

*Primary Examiner* — Fatoumata Traore
(74) *Attorney, Agent, or Firm* — Trop, Pruner & Hu, P.C.

(57) ABSTRACT

An embodiment includes an automatic policy managed password management system. One embodiment manages changing the password (with little to no user interaction) every set number of days. Also, password changes can be made within a set amount of time from the password being viewed by a user. Further, an embodiment includes a web service that contains an "insert record" method to insert a password management record into a managed machine and/or database with no "pre-work" required to use the web service. For example, no record needs to be created on a database and/or managed machines in advance of deploying passwords via the web service. The web service can be pushed to various machines and when the web service starts up, it may insert its own record into a database or managed client. This allows for scalability. Other embodiments are described herein.

20 Claims, 3 Drawing Sheets

(56) References Cited

U.S. PATENT DOCUMENTS

| | | | |
|---|---|---|---|
| 8,522,026 B2* | 8/2013 | Koga | 713/170 |
| 8,539,562 B2* | 9/2013 | Bolik et al. | 726/6 |
| 2006/0021036 A1 | 1/2006 | Chang et al. | |
| 2006/0271789 A1 | 11/2006 | Satomura et al. | |
| 2009/0037984 A1* | 2/2009 | Andrasak et al. | 726/5 |
| 2009/0235345 A1* | 9/2009 | Oikawa et al. | 726/7 |
| 2009/0320108 A1 | 12/2009 | Livingston | |
| 2011/0265160 A1* | 10/2011 | Nettleton | 726/6 |
| 2013/0014236 A1* | 1/2013 | Bingell et al. | 726/6 |

FOREIGN PATENT DOCUMENTS

| | | |
|---|---|---|
| JP | 2002207700 | 7/2002 |
| JP | 2004295711 | 10/2004 |
| JP | 2005190285 | 7/2005 |
| JP | 2006-011894 | 1/2006 |
| JP | 2007065774 | 3/2007 |
| JP | 2008225872 | 9/2008 |
| JP | 2009-116726 | 5/2009 |
| JP | 2009223452 | 10/2009 |
| JP | 2014532226 | 12/2014 |
| WO | WO2010039487 | 4/2010 |

OTHER PUBLICATIONS

European Patent Office, "Communication, Extended Search Report" dated May 15, 2015, in European application No. 11 87 3076.1.

China Patent Office, Office Action mailed Nov. 3, 2015 in Chinese Patent Application No. 201180073884.8.

International Searching Authority, "Notification of Transmittal of the International Search Report and the Written Opinion of the International Searching Authority," mailed May 16, 2012, in International application No. PCT/US2011/054445.

Korean Patent Office, Notice of Rejection mailed Apr. 14, 2015, in Korean Patent Application No. 10-2014-7008289.

Korean Patent Office, Notice of Rejection mailed Sep. 23, 2015, in Korean Patent Application No. 10-2014-7008289.

Japan Patent Office, Notice of Reasons for Rejection mailed Jan. 10, 2017 in Japanese Patent Application No. 2015-218821.

People's Republic of China State Intellectual Property Office, Second Office Action mailed Jul. 8, 2016 in Chinese Patent Application No. 2011800073884.8.

* cited by examiner

AUTOMATED PASSWORD MANAGEMENT

BACKGROUND

Within a datacenter local passwords need to be accessible to multiple parties at all hours of the day and night. Such password access conventionally depends on manual practices (e.g., keeping hand written notes of passwords). To improve upon manual practices, software implemented solutions exist. However, the software based techniques are overly "user centric". For example, a user changes a password locally on a machine (e.g., server or client) and then updates a password management database. This user, however, retains knowledge of the new password after updating the database. The user continues to know the password until it is changed again at some stage in the future. This retention of knowledge with one user is less than ideal for security reasons.

Other conventional methods of password management involve setting a single password on multiple machines. However, because the same password is used on multiple machines then one breach on one system may lead to breaches on many other systems. Other techniques are also problematic. For example, "server centric" techniques may use an Active Directory account to loop through a list of clients while remotely changing the password for each client. However, doing so requires high level privileges for each target machine. This also requires very tight integration with each machine, thereby making massive rollout of the password management system impractical if many target machines are involved.

Still other methods simply change the password daily. However, this too is not scalable to large volumes of machines. For example, a datacenter with 100 machines may have difficulty if each day a system had to issue a new password to each of the 100 machines, receive confirmation of the switch, and the like. Also, such a system may require the database record for a client to be created in advance of the system changing out passwords. This too leads to poor scalability by complicating the initial rollout of the password management service.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a robust automatic policy based password management system. Embodiments may include, for example only, any or all of the following features: strong account passwords, password change frequency at set intervals (e.g., 90 days), unique passwords for all managed machines, the ability to revoke access when a user changes roles (e.g., employee is fired or goes on leave of absence), passwords are shared on a need to know basis (e.g., password rights are known on per device or per data set basis), passwords are communicated using secure methods, auditing of passwords is possible, traceability of password access is enabled, and the ability to change a password a set time after a user gains knowledge of that password. Embodiments may be highly automated with few user management tasks. Also, embodiments may be highly scalable. Furthermore, embodiments may be policy driven and, accordingly, customized based on different requirement sets.

Figure 1:
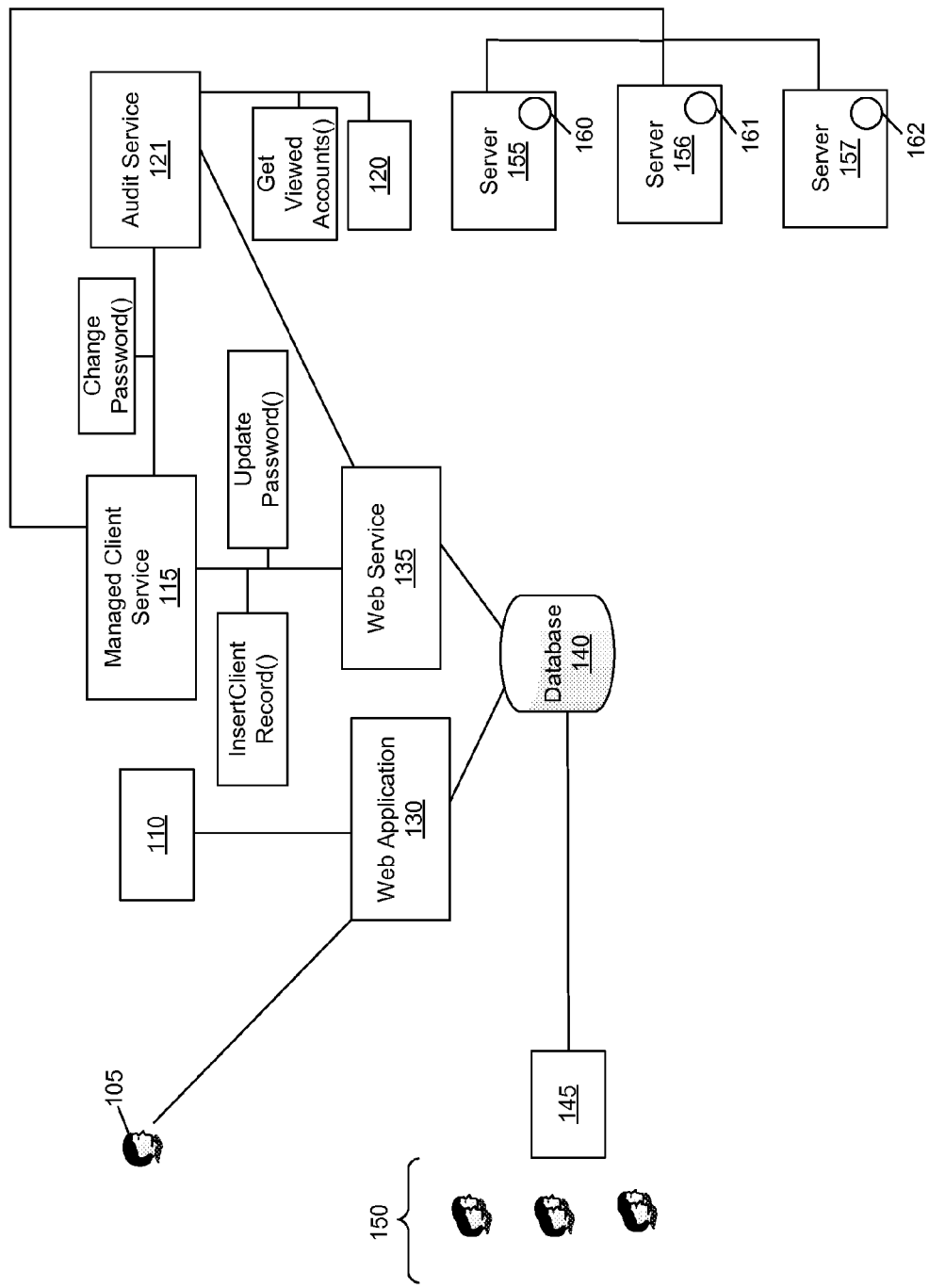
FIG. 1 includes a client architecture in one embodiment of the invention.

FIG. 1 includes a client architecture in one embodiment of the invention. The embodiment is a policy driven, automated local administrator password management system. An embodiment includes various components. Database 140 may contain a list of servers, accounts, and/or access control lists for those accounts. Web application 130 may include a user interface a user may use to search for a server and query for the password. User 105 may need to be a member of the correct access control list (ACL) to have permission to view passwords. When a password is viewed, this activity may be logged in audit database 120. Web service 135 may include methods for inserting a record into a server (e.g., database 140 located on a server) and/or password into a system (e.g., target or managed server 155, 156, 157) with no such record already in place. Service 135 may also update a server's password (e.g., on database 140 and/or managed server 155, 156, 157) where a password record already exists on the managed server. Service 135 may also query for servers that have had their password viewed, and the like.

More specifically, managed client service 115 may include a software service installed on or in communication with each managed machine (155, 156, 157). The service may change the local administrator password according to a policy, such as every 90 days, and may update the database through web service 135. The service may also open a port to allow certain commands, like a Change Password command discussed further below, to be invoked remotely on machine 155, 156, 157 via various forms of remote access (e.g., through .NET remoting by the Audit Service 121). The time period mentioned above (90 day policy) is read from a local configuration file. Service 115 then updates a backend of database 140, via web service 135, therefore removing user 105 from the solution. A remoting port is opened by the service to allow the Change Password functionality to be invoked remotely. In an embodiment, there are no parameters to the call for Change Password. Invoking the call simply initiates the password to be changed and the backend of database 135 to be updated.

In addition to web service 115, which may implement changes to passwords automatically, in one embodiment manual changes to passwords may be implemented via module 110.

Audit service 121 may query audit database 120 for servers that have had their password viewed and how long it has been since the viewing (e.g., using a GetViewedAccounts( ) command). Service 121 may determine if the time that has passed since the viewing surpasses a threshold (e.g., two hours). If so, service 121 may remotely invoke the Change Password command (examples of which are provided below) on the targeted server in question. As a result, the password that the user previously knew is no longer valid.

Audit service 121 may include a monitoring service so if audit service 121 cannot contact a server to remotely change a password, service 121 may log an event to an event log that an alert monitoring service (e.g., Microsoft Operations Manager (MOM)) monitors. This raises a ticket or alarm for staff administrators to further investigate the issue.

In an embodiment, enterprise access management (EAM) services 145 may be located on a server and may maintain ACLs for various users 150. Access to view a server's (155, 156, 157) password is controlled through such ACLs. These ACLs are managed through EAM 145, which assigns an access or privilege level to each of users 150. This allows the granularity of sharing passwords per device, per data set, and the like (i.e., one can control with precision what rights a user has and what rights a user does not have).

Regarding deployment of a password management system, the first time the password system management system operates service 135 may "insert" a record into database 140. The record may include, for example, the server identifier, server password, relevant ACL privileges for accessing the server, and a description for the ACL. System 135 may subsequently update this password record each time it connects to database 140. This makes deployment very scalable (e.g., to 100,000 machines) and yet still keeps granularity of need to know access to device or data set levels of distinction. Records may also be inserted on the target machines 155, 156, 157 themselves.

Figure 2:
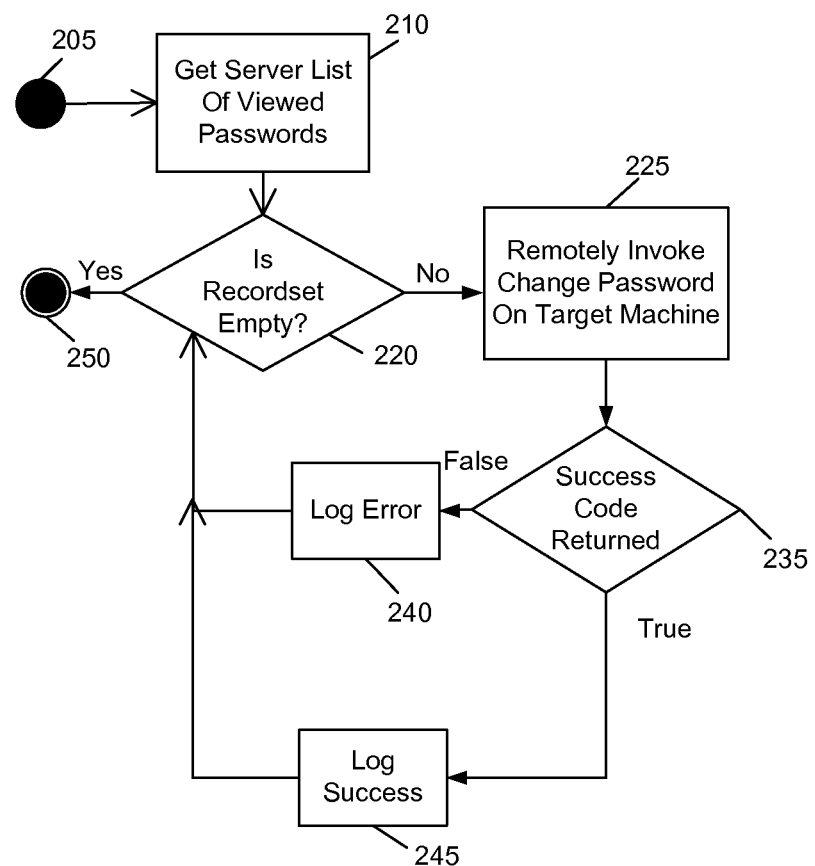
FIG. 2 includes a schematic flow chart in an embodiment of the invention.

FIG. 2 includes a schematic flow chart in an embodiment of the invention. Process 200 begins in block 205. Block 210 determines a list of passwords or credentials that have been viewed by a user. This determination may be based on audit service 121 auditing activity logged in audit database 120.

Block 220 determines if the list from block 210 is empty. If yes, the process ends in block 250. If not, block 225 remotely invokes a Change Password command on a target machine. This may be done using, for example, managed client service 115 and the following pseudocode:
 //CHANGE PASSWORD LOCALLY
 string sPath=string.Format ("WinNT://{0}/Administrator", Environment.MachineName);
 DirectoryEntry directoryEntry=new DirectoryEntry (sPath);
 directoryEntry.Invoke("SetPassword", password);
 directoryEntry.CommitChanges( );
Generating the new password may be accomplished using, for example, managed client service 115 and the following pseudocode:
 //GENERATE RANDOM PASSWORD
 PasswordGenerator generator=new PasswordGenerator( );
 string password=generator.Generate( );

Access to the machine may be done via .NET remoting and the like.

In block 235, if the transaction is not successfully completed the failure may be logged in the audit database 120 with subsequent alerts made (e.g., MOM alert) to follow up on this issue (block 240). If the transaction is successful, the success may be logged in the audit database 120 (block 245). Regarding the transaction itself, the record in database 140 may be edited using, for example, managed client service 115 and the following pseudocode:
 //CONFIG FILE RELEVANT INFO TO INSERT A RECORD INTO DATABASE
 <add key="accountName" value="Administrator"/>
 <add key="permissionGroup" value="databaseSupportTeam"/>
 <add key="changeFrequencyDays" value="90"/>

Figure 3:
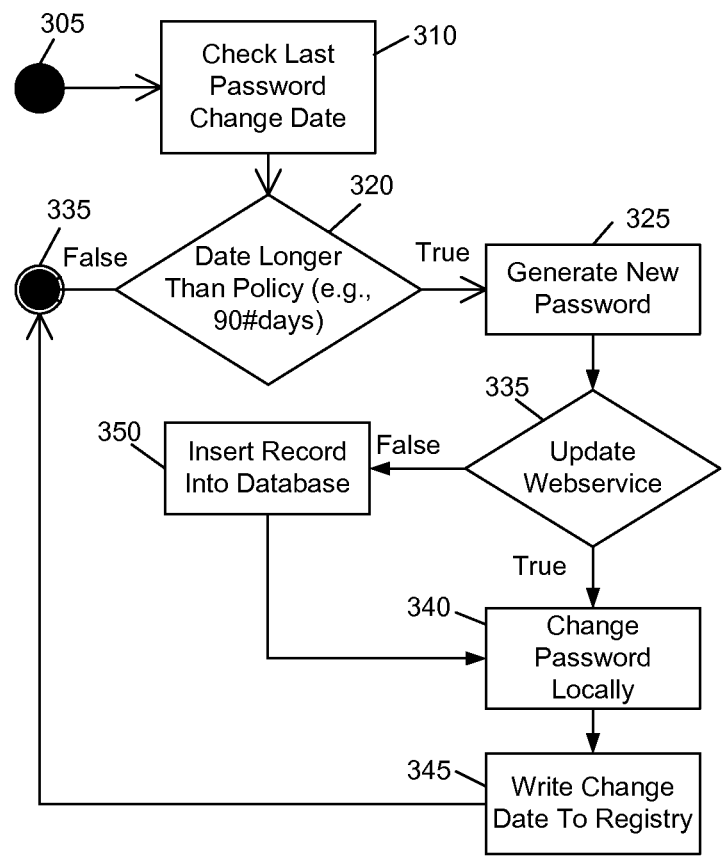
FIG. 3 includes a schematic flow chart in an embodiment of the invention.

FIG. 3 includes a schematic flow chart in an embodiment of the invention. Process 300 may begin in block 305. During normal operation, a service (e.g., Windows Service, Linux Daemon) may wake up every 24 hours and perform process 300.

Block 310 checks the last password change date. This may be done in concert with consulting audit database 120 and audit service 121. The "change date" may be stored, in encrypted form, in a registry. In block 320 the findings from blocks 310 are checked against a threshold. If the threshold is not met then the process may end at block 355. However, if the threshold is met then in block 325 a new password may be generated using, for example, the following pseudo code:
 //GENERATE RANDOM PASSWORD
 PasswordGenerator generator=new PasswordGenerator( );
 string password=generator.Generate( );

In block 335 web service 115 may determine if a password record already exists. If not, in block 350 a new record may be generated and injected into database 140 using, for example, the following pseudocode:
 //INSERT RECORD INTO DATABASE
 webService.InsertClientRecord(accountName, password, permissionGroup, account_description)
The record may be populated using the following pseudocode:
 //CONFIG FILE RELEVANT INFO TO INSERT A RECORD INTO DATABASE
 <add key="accountName" value="Administrator"/>
 <add key="permissionGroup" value="databaseSupportTeam"/>
 <add key="changeFrequencyDays" value="90"/>

In block 340 passwords may be changed on the target machines 155, 156, 157. For as long as there are machines identified in block 320 that need to be changed, a loop for implementing such a change or changes is as follows:
 for each (string server in servers)
 { string managerUrl=string.Format("tcp://{0}:19010/PasswordManager.rem", server);
 IPasswordManager manager=(IPasswordManager)Activator.GetObject(typeof(IPasswordManager),
 manager.ChangePassword( );}

Thus, regarding blocks 340 and 350, in an embodiment a Client Service running on each managed machine attempts to update its password in the database. This may be attempted, for example, in block 335. The managed machine calls, for example, an UpdatePassword( )method that only requires a machine name and password as parameters. Thus, the method runs very quickly and the process may advance from block 335 to block 340 (while bypassing block 350). However, a record must exist in the database before any such updating occurs. If the record does not exist, then in block 350 the client must call, for example, an InsertRecord( )method, which takes in more parameters than the UpdatePassword( )method and consequently runs slower than the UpdatePassword( ) method.

In block 345 a registry (e.g., audit database 120) may be updated. In block 355 the process ends.

As an additional note, in one embodiment the database is always updated first and only then, the password is changed locally on the managed client machine. This may avoid the scenario of changing the password locally on the managed client machine and then being unable to update the database (e.g., due to connectivity errors). Such a situation may result in no one being able to query the new password. Thus, in one embodiment if the database cannot be contacted then the password is not changed locally.

Thus, embodiments may include a "Managed Client" that manages changing the password without user interaction every set number of days, then updates a backend system with a new password. Also, password changes can be made within a set amount of time from the password being viewed by a user. This monitoring of state (e.g., how long has passed since a password has been changed) may be performed by an "Audit Service" instead of or in conjunction with the "managed client" service. Also, an embodiment includes a web service that contains an "insert record" method. Thus, no "pre-work" is required to use the web service. For example, no record needs to be created on a database in advance of deploying passwords via the web service. The web service can be pushed to any machine and when the web service starts up, it may insert its own record into a database. This allows for scalability to 100,000 machines or more.

An embodiment may (a) determine a first plurality of processor-based systems whose respective first password credentials (e.g., passwords or other elements used to gain privileged access to a resource) were viewed (e.g., by a human user) in a first preceding time period (e.g., two hours); and (b) from an additional processor-based system remotely located (e.g., via a network that extends over a large physical area) from the first plurality of systems, remotely change the respective first password credentials for each of the first plurality of systems based on determining the first password credentials were viewed in the first preceding time period.

That same embodiment or another embodiment may determine a second plurality of systems whose respective second password credentials (which may be the same as the first password credentials) were not changed in a second preceding time period (e.g., 90 days); and from the additional system, remotely change the respective second password credentials for each of the second plurality of systems based on determining the second password credentials were not changed in the second preceding time period.

Changing the respective first or second password credentials may include supplying unique passwords as replacement for the old passwords. Each machine (e.g., tablet, server, personal digital assistant, Smartphone) may get a unique password.

An embodiment may initially set up a password credential management account for a system; and upon initially setting up the account, remotely insert a record into a database from the additional processor-based system. However, the database may have had no preexisting record associated with the password credential management account. This may allow for scalability or roll-out of the account system among many, many machines that are to be managed. This "insertion" of a record may be on the machine that is to be managed, on a server that holds a database of password records (that is stored on the machine to be managed or on some other separate machine).

Although embodiments herein have been discussed herein with specific technologies (e.g., Microsoft technologies such as Windows Service, Linux Daemon, .NET Remoting, and the like) the solution could be supported across any operating system, various platforms, and the like.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transient machine-accessible storage medium including instructions that when executed enable at least one machine to:
   log, in an audit database, when first password credentials for a first plurality of processor-based systems were viewed;
   query the audit database, using an audit service, to determine the first password credentials were viewed in a first preceding time period;
   determine the first preceding time satisfies a threshold; and
   from an additional processor-based system remotely located from the first plurality of systems, remotely invoke changing the respective first password credentials for each of the first plurality of systems based on determining: (a) the first password credentials were viewed in the first preceding time period, and (b) the first preceding time satisfies the threshold;

wherein remotely invoking changing the respective first password credentials for each of the first plurality of systems comprises remotely invoking code to be executed on the first plurality of systems to change the first password credentials.

2. The at least one medium of claim 1 including instructions that enable the at least one machine to:

determine a second plurality of systems whose respective second password credentials were not changed in a second preceding time period; and from the additional system, remotely invoke changing the respective second password credentials for each of the second plurality of systems based on determining the second password credentials were not changed in the second preceding time period.

3. The at least one medium of claim 2, wherein remotely invoking changing the respective second password credentials includes supplying a unique additional second password for each of the second plurality of systems.

4. The at least one medium of claim 1, wherein remotely invoking changing the respective first password credentials includes supplying a unique additional first password for each of the first plurality of systems.

5. The at least one medium of claim 1 including instructions that enable the at least one machine to:

initially set up a password credential management account for an additional one of the first plurality of systems; and upon initially setting up the password credential management account, remotely insert a record into a database from the additional system;

wherein the database had no preexisting record associated with the password credential management account.

6. The at least one medium of claim 5 including instructions that enable the at least one machine to remotely populate the record with a password, wherein the record includes a computing node identifier and access control list (ACL) privileges.

7. The at least one medium of claim 1 including instructions that enable the at least one machine to:

initially set up a password credential management account for an additional one of the first plurality of systems; and upon initially setting up the password credential management account, remotely insert a password record into the additional one of the first plurality of systems;

wherein the additional one of the first plurality of systems had no preexisting password record associated with the password credential management account.

8. The at least one medium of claim 7, wherein the password record includes a password.

9. The at least one medium of claim 1 including instructions that enable the at least one machine to:

determine an additional one of the first plurality of systems whose respective first password credentials have not been changed within an expired threshold time period that has transpired since the password credentials were viewed; and from the additional system, automatically and remotely change the first password credentials for the additional one of the first plurality of systems based on the expiration of the threshold time period.

10. The at least one medium of claim 1 including instructions that enable the at least one machine to:

initially set up a password credential management account for an additional one of the first plurality of systems; and upon initially setting up the password credential management account, remotely insert a password into the additional one of the first plurality of systems;

wherein the additional one of the first plurality of systems had no preexisting password associated with the password credential management account.

11. The at least one medium of claim 1 including instructions that enable the at least one machine to:

affirmatively identify an additional one of the first plurality of systems whose respective first password credentials have not been changed within an expired threshold time period that has transpired since the password credentials were viewed; and from the additional system, automatically and remotely change the first password credentials for the additional one of the first plurality of systems based on the expiration of the threshold time period.

12. A method comprising:

logging, in an audit database, when second password credentials for a second plurality of processor-based systems were viewed;

querying the audit database, using an audit service, to determine the second password credentials were viewed in a second preceding time period; and determining the second preceding time satisfies a threshold;

from an additional processor-based system remotely located from the second plurality of systems, remotely invoke changing the respective second password credentials for each of the second plurality of systems based on: (a) logging when the second password credentials were viewed, (b) querying the audit database to determine the second password credentials were viewed in the second preceding time period, (c) determining the second preceding time satisfies the threshold;

wherein remotely invoking changing the respective second password credentials for each of the second plurality of systems comprises remotely invoking code to be executed on the second plurality of systems to change the second password credentials.

13. The method of claim 12 comprising:

determining a first plurality of systems whose respective first password credentials were not changed in a first preceding time period; and from the additional system remotely located from the first plurality of systems, remotely invoking changing the respective first password credentials for each of the first plurality of systems based on determining the first password credentials were not changed in the second preceding time period.

14. The method of claim 13 comprising:

determining an additional one of the first plurality of systems whose respective first password credentials have not been changed within an expired threshold time period that has transpired since the password credentials were viewed; and from the additional system, automatically and remotely changing the first password credentials for the additional one of the first plurality of systems based on the expiration of the threshold time period.

15. The method of claim 13 comprising:

initially setting up a password credential management account for an additional one of the first plurality of first systems; and upon initially setting up the password credential management account, remotely inserting a record into a database from the additional system;

wherein the database had no preexisting record associated with the password credential management account.

16. A system comprising:

at least one memory;

at least one processor, coupled to the at least one memory, to (a) log, in an audit database, when first password credentials for a first plurality of processor-based systems were viewed; (b) query the audit database, using an audit service, to determine the first password credentials were viewed in a first preceding time period; (c) determine the first preceding time satisfies a threshold; and (d) remotely invoke changing the respective first password credentials for each of the first plurality of systems based on: querying the audit database to determine the first password credentials were viewed in the first preceding time period and determining the first preceding time satisfies the threshold;

wherein remotely invoking changing the respective first password credentials for each of the first plurality of systems comprises remotely invoking code to be executed on the first plurality of systems to change the first password credentials.

17. The system of claim 16, wherein the processor is to:

determine a second plurality of systems whose respective second password credentials were not changed in a second preceding time period; and from the additional system, remotely invoke changing the respective second password credentials for each of the second plurality of systems based on determining the second password credentials were not changed in the second preceding time period.

18. The system of claim 16, wherein remotely invoking changing the respective first password credentials includes supplying a unique additional first password for each of the first plurality of systems.

19. The system of claim 16, wherein the processor is to:

initially set up a password credential management account for an additional one of the first plurality of systems; and upon initially setting up the password credential management account, remotely insert a record into a database from the additional one of the first plurality of systems;

wherein the database had no preexisting record associated with the password credential management account.

20. The system of claim 16, wherein the processor is to:

determining a first plurality of systems whose respective first password credentials were not changed in a first preceding time period; and from an additional processor-based system remotely located from the first plurality of systems, remotely invoking changing the respective first password credentials for each of the first plurality of systems based on determining the first password credentials were not changed in the second preceding time period.

* * * * *